United States Patent
Aya et al.

(10) Patent No.: US 9,902,520 B2
(45) Date of Patent: Feb. 27, 2018

(54) AUTOMATIC TAKING-OUT METHOD AND DEVICE FOR PACKAGED CONTENTS

(71) Applicant: FUJIFILM Corporation, Tokyo (JP)

(72) Inventors: Shinichi Aya, Ashigarakami-gun (JP); Junichi Kinoshita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 138 days.

(21) Appl. No.: 14/701,935

(22) Filed: May 1, 2015

(65) Prior Publication Data

US 2015/0314903 A1 Nov. 5, 2015

(30) Foreign Application Priority Data

May 2, 2014 (JP) .................................. 2014-095271

(51) Int. Cl.
*B65B 69/00* (2006.01)

(52) U.S. Cl.
CPC ...... *B65B 69/0033* (2013.01); *B65B 69/0008* (2013.01); *B65G 2201/0235* (2013.01)

(58) Field of Classification Search
CPC . B65B 69/0033; B65B 69/00; B65B 69/0008; B65B 61/005; B65B 61/06; B28C 7/064; B65G 65/23; B65G 2201/0235; B65G 2201/0238
USPC ....................................................... 414/412
See application file for complete search history.

(56) References Cited

U.S. PATENT DOCUMENTS

| | | | | |
|---|---|---|---|---|
| 3,757,973 A | * | 9/1973 | Lambert | B65B 69/0008 30/2 |
| 3,853,235 A | * | 12/1974 | Lambert | B65B 69/0008 414/412 |
| 5,234,105 A | * | 8/1993 | Sato | B65B 69/00 206/213.1 |
| 5,442,895 A | * | 8/1995 | Linson | B65B 69/0008 414/412 |

FOREIGN PATENT DOCUMENTS

| | | | | |
|---|---|---|---|---|
| EP | 0279870 A1 | * | 8/1988 | ............. B43M 7/02 |
| JP | 10-194251 A | | 7/1998 | |
| JP | 2001-261015 A | | 9/2001 | |
| JP | 2002-059912 A | | 2/2002 | |

* cited by examiner

*Primary Examiner* — Glenn F Myers
(74) *Attorney, Agent, or Firm* — Birch, Stewart, Kolasch & Birch, LLP

(57) ABSTRACT

An automatic taking-out device is configured by providing a package holding unit that holds the package; a cutting unit that cuts the two packaging sheet materials of the package in a held state in two cutting spots that are respectively present between the joining portions and the contents and that face each other with the contents therebetween; a pair of suction units that respectively suction and hold the two packaging sheet materials inside the two cutting spots; a driving unit that moves at least one of the suction units in a direction separated from the contents; and an inclining unit that inclines the two packaging sheet materials inside the two cutting spots and the contents in a state where a positional deviation in an up-down direction occurs with respect to the two cutting spots, and drops the contents out of the two packaging sheet materials.

14 Claims, 6 Drawing Sheets ical high polymer films, or the like, as packaging sheet materials. Packages formed by contents being disposed between two packaging sheet materials and the packaging sheet materials being joined to each other around contents without being limited to the SP have been widely provided for practical use.

AUTOMATIC TAKING-OUT METHOD AND DEVICE FOR PACKAGED CONTENTS

CROSS-REFERENCE TO RELATED APPLICATIONS

The present application claims priority under 35 U.S.C. § 119 to Japanese Patent Application No. 2014-095271, filed on May 2, 2014. The above application is hereby expressly incorporated by reference, in its entirety, into the present application.

BACKGROUND OF THE INVENTION

1. Field of the Invention

The present invention relates to a method of automatically taking out contents from a package formed by the contents being contained in a bag-shaped packaging sheet material.

Additionally, the present invention relates to a device for carrying out such a method.

2. Description of the Related Art

In the related art, there have been known so-called strip packages (SP) formed by contents (packaged object) being stored therein, for example, using laminate films formed by superposing aluminum foil sheets, thermoplastic high polymer films, or the like, as packaging sheet materials. Packages formed by contents being disposed between two packaging sheet materials and the packaging sheet materials being joined to each other around contents without being limited to the SP have been widely provided for practical use.

In many cases, this type of package is loaded into devices using the contents thereof and is handled for the processing of taking out the contents. As devices that take out contents from such a package, for example, devices described in JP2001-261015A, JP2002-059912A, and JP1998-194251A (JP-H10-194251A) have been known in the related art.

An opening device, which is adapted to draw out contents from an opening spot to the outside of two packaging sheet materials storing the contents using nip rolls after the packaging sheet materials made into a bag shape is cut and opened in one spot, is disclosed in JP2001-261015A.

An opening device, which is adapted to tear off one opened packaging sheet material storing plate-like contents from the contents after the packaging sheet material is cut and opened in three directions, is disclosed in JP2002-059912A.

An opening device, which is adapted to rock a bag-shaped packaging sheet material storing contents on an inclined chute and drop the contents from an opening spot to the outside of the packaging sheet material after the packaging sheet material is cut and opened in one spot, is disclosed in JP1998-194251A (JP-H10-194251A).

SUMMARY OF THE INVENTION

However, in the device disclosed in JP2001-261015A, it is confirmed that a poor taking-out situation occurs due to the contents being stuck in a gap between the nip rolls for drawing out the contents and due to degradation of the nip rolls.

Additionally, in the device disclosed in JP2002-059912A, a process of manually taking out the contents (stainless plate) is assumed. Since the process requiring manpower is present in the device, it is impossible to totally automatically take out the contents from the package.

Additionally, in the device disclosed in JP1998-194251A (JP-H10-194251A), it is confirmed that, as wrinkles are generated in the packaging sheet material after opening, dropping of the contents is hindered and a poor taking-out situation is apt to occur.

The invention has been made in view of the above circumstances, and an object thereof is to provide a method capable of automatically and reliably taking out contents from a package formed by the contents being stored in bag-shaped packaging sheet materials.

Additionally, another object of the invention is to provide a device capable of carrying out the method as described above.

The automatic taking-out method for packaged contents according to the invention is an automatic taking-out method for packaged contents of automatically taking out contents from a package formed by the contents to be packaged being disposed between two packaging sheet materials and the two packaging sheet materials being joined to each other around the contents. The automatic taking-out method includes a step of holding the package in a state where the two packaging sheet materials are located up and down with respect to each other; a step of cutting the two packaging sheet materials in two cutting spots that are respectively present between the joining portions and the contents and that face each other with the contents therebetween; a step of moving at least one of suction units in a direction separated from the contents and increasing a distance between the two packaging sheet materials after the two packaging sheet materials inside (that is, the central side of the packaging sheet materials where the contents is present) the two cutting spots are respectively suctioned and held by the suction units; and a step of inclining the two packaging sheet materials inside the two cutting spots and the contents in a state where a positional deviation in an up-down direction, that is, a vertical direction, occurs with respect to the two cutting spots, and dropping and taking the contents out of the two packaging sheet materials.

In addition, the above expression "the packaging sheet materials being joined to each other around the contents" means that packaging sheet materials are joined together so as to surround the contents outside an outer edge of the contents.

It is desirable that the automatic taking-out method for packaged contents according to the invention having the above configuration further includes a step of pushing out the contents in a drop direction when the contents is dropped.

Additionally, it is desirable that the automatic taking-out method for packaged contents according to the invention further includes a step of pressing the two packaging sheet materials from above and below to fix the two packaging sheet materials and the contents between the two packaging sheet materials when the cutting is performed.

Additionally, it is desirable that the automatic taking-out method for packaged contents according to the invention further includes a step of fixing the portions of at least one of the two packaging sheet materials, which are present outside the two cutting spots when the cutting is performed.

Additionally, it is desirable that the automatic taking-out method for packaged contents according to the invention further includes a step of sending the portions of the two packaging sheet materials outside the two cutting spots to a disposal position and disposing of the portions after the cutting is performed.

Additionally, it is desirable that the automatic taking-out method for packaged contents according to the invention further includes a step of sending the portions of the two packaging sheet materials inside the two cutting spots to a disposal position and disposing of the portions after the contents is dropped and taken out.

Additionally, it is desirable that the automatic taking-out method for packaged contents according to the invention further includes a step of transferring the contents taken out of the two packaging sheet materials in a predetermined posture.

Additionally, in the automatic taking-out method for packaged contents according to the invention, it is desirable that the cutting spots have a shape resembling the shape of the joining portions of the packaging sheet materials, that is, a shape along the shape of inner end edges of the joining portions.

Additionally, in the automatic taking-out method for packaged contents according to the invention, it is desirable that a plurality of the suction units are used for one packaging sheet material.

Additionally, in the automatic taking-out method for packaged contents according to the invention, it is desirable that a suction unit in which a major axis of a suction surface extends along a cutting direction of the cutting spots is used as the suction unit. In addition, the above expression "a cutting direction of the cutting spots" means that the major axis of the suction surface becomes parallel to the cutting spots, for example, when the cutting spots have one linear shape.

Additionally, in the automatic taking-out method for packaged contents according to the invention, it is preferable that a plate-shaped package in which the contents has flat surfaces, respectively, on one side and on the other side of the two packaging sheet materials is used as a target to be handled.

Meanwhile, the automatic taking-out device for packaged contents according to the invention is an automatic taking-out device for packaged contents that automatically takes out contents from a package formed by the contents to be packaged being disposed between two packaging sheet materials and the two packaging sheet materials being joined to each other around the contents. The automatic taking-out device includes a package holding unit that holds the package in a state where the two packaging sheet materials are located up and down with respect to each other; a cutting unit that cuts the two packaging sheet materials of the package in a held state in two cutting spots that are respectively present between the joining portions and the contents and that face each other with the contents therebetween; a pair of suction units that respectively suction and hold the two packaging sheet materials inside the two cutting spots; a driving unit that moves at least one of the pair of suction units in a direction separated from the contents; and an inclining unit that inclines the two packaging sheet materials inside the two cutting spots and the contents in a state where a positional deviation in an up-down direction occurs with respect to the two cutting spots, and drops and takes the contents out of the two packaging sheet materials.

It is desirable that the automatic taking-out device for packaged contents according to the invention having the above configuration further includes a drop assisting unit that pushes the contents in a direction toward a lower cutting spot from an upper cutting spot when the two packaging sheet materials and the contents is inclined by the inclining unit.

As such a drop assisting unit, for example, a drop assisting unit configured to push the contents with an air jet stream or a drop assisting unit configured to push the contents using a pusher that reciprocates can be suitably used.

Additionally, it is desirable that the automatic taking-out device for packaged contents according to the invention further includes a package fixing unit that presses the two packaging sheet materials from above and below to fix the two packaging sheet materials and the contents between the two packaging sheet materials when the cutting using the cutting unit is performed.

Additionally, it is desirable that the automatic taking-out device for packaged contents according to the invention further includes a packaging sheet material fixing unit that fixes the portions of at least one of the two packaging sheet materials, which are present outside the two cutting spots when the cutting is performed.

Additionally, it is desirable that the automatic taking-out device for packaged contents according to the invention further includes a sheet material end portion disposal unit that sends the portions of the two packaging sheet materials outside the two cutting spots to a disposal position and disposes of the portions after the cutting is performed.

Additionally, it is desirable that the automatic taking-out device for packaged contents according to the invention further includes a sheet material central portion disposal unit that sends the portions of the two packaging sheet materials inside the two cutting spots to a disposal position, and disposes of the portions after the contents falls out of the two packaging sheet materials.

Additionally, it is desirable that the automatic taking-out device for packaged contents according to the invention further includes a contents transfer unit that transfers the contents taken out of the two packaging sheet materials in a predetermined posture.

Additionally, in the automatic taking-out device for packaged contents according to the invention, it is desirable that the cutting unit is configured so as to perform the cutting in cutting spots having a shape resembling the shape of the joining portions of the packaging sheet materials.

Additionally, in the automatic taking-out device for packaged contents according to the invention, it is desirable that the cutting unit is a cutting unit having a saw blade shape.

Additionally, in the automatic taking-out device for packaged contents according to the invention, it is desirable that a plurality of the suction units are provided for one packaging sheet material.

Also, it is desirable that the plurality of such suction units are arranged side by side in a direction orthogonal to a cutting direction of the cutting spots. In addition, the "direction orthogonal" also includes the case of being substantially orthogonal where an angle slightly deviates from being completely orthogonal (for example, a line segment connecting the centers of outermost suction units is about ±10 degrees with respect to the above "direction orthogonal" if defined according to an angle), in addition to the case of being completely orthogonal.

Additionally, in the automatic taking-out device for packaged contents according to the invention, it is desirable that the suction unit is a suction unit in which a major axis of a suction surface extends along a cutting direction of the cutting spots.

Since the automatic taking-out method for packaged contents according to the invention includes the step of holding the package in a state where the two packaging sheet materials are located up and down with respect to each other; the step of cutting the two packaging sheet materials in the two cutting spots that are respectively present between the joining portions and the contents and that face each other with the contents therebetween; the step of moving at least one of suction units in the direction separated from the contents and increasing the distance between the two packaging sheet materials after the two packaging sheet materials inside the two cutting spots are respectively suctioned and held by the suction units; and the step of inclining the two packaging sheet materials inside the two cutting spots and the contents in a state where a positional deviation in the up-down direction occurs with respect to the two cutting spots, and dropping and taking the contents out of the two packaging sheet materials, it is possible to reliably drop the contents from between the two packaging sheet materials between which the distance is increased, and to automatically and stably take the contents out of the packaging sheet materials to the outside.

Meanwhile, since the automatic taking-out device for packaged contents according to the invention includes the package holding unit that holds the package in a state where the two packaging sheet materials are located up and down with respect to each other; the cutting unit that cuts the two packaging sheet materials of the package in a held state in the two cutting spots that are respectively present between the joining portions and the contents and that face each other with the contents therebetween; the pair of suction units that respectively suction and hold the two packaging sheet materials inside the two cutting spots; the driving unit that moves at least one of the pair of suction units in the direction separated from the contents; and the inclining unit that inclines the two packaging sheet materials inside the two cutting spots and the contents in a state where a positional deviation in the up-down direction occurs with respect to the two cutting spots, and drops the contents out of the two packaging sheet materials, the method of the invention that exhibits the above effects can be carried out.

DESCRIPTION OF THE PREFERRED EMBODIMENTS

Figure 1:
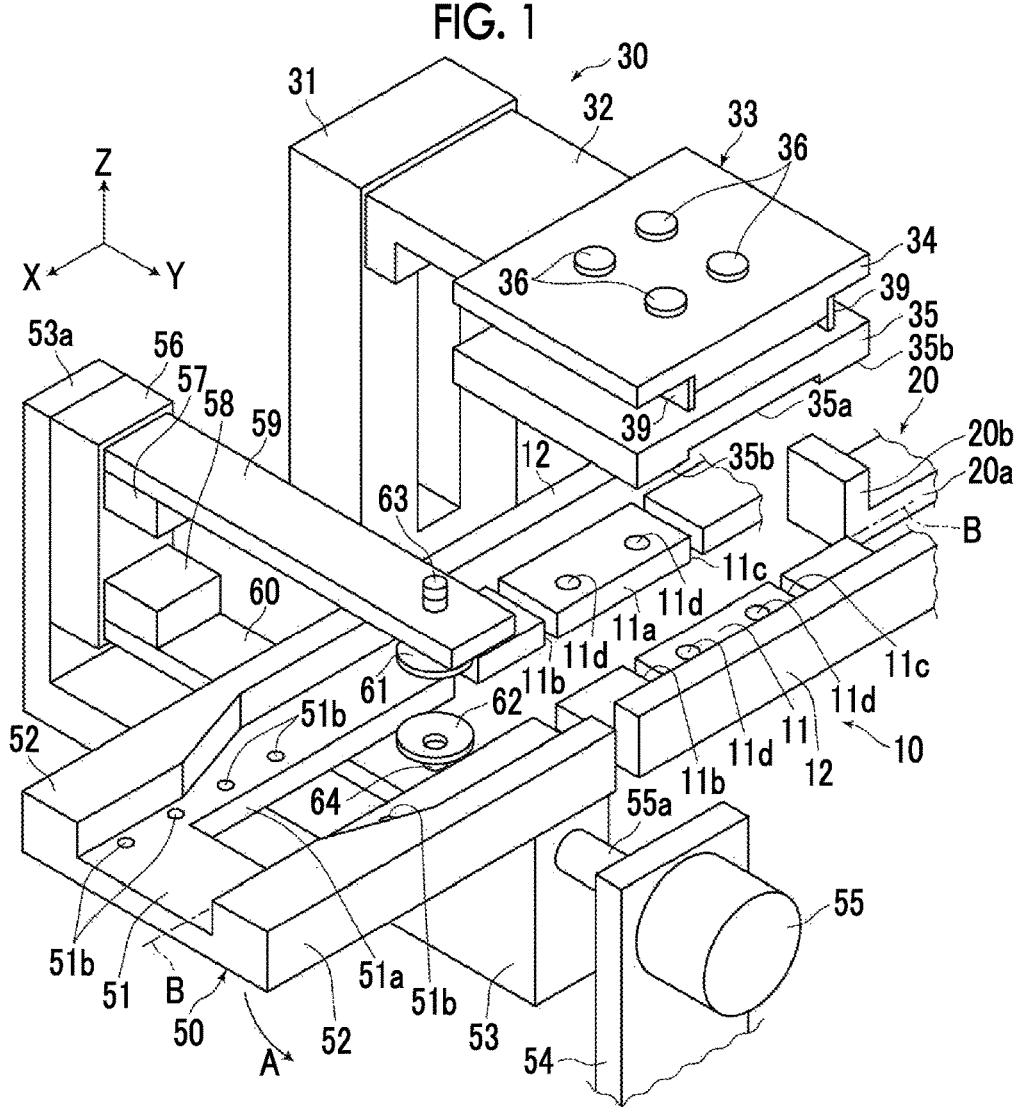
FIG. 1 is a perspective view illustrating essential portions of an automatic taking-out device for packaged contents according to an embodiment of the invention.

Hereinafter, an embodiment of the invention will be described in detail with reference to the drawings. FIG. 1 is a perspective view illustrating essential portions of an automatic taking-out device for packaged contents according to the embodiment of the invention. As illustrated in this drawing, the present device has a fixed guide 10 as a package holding unit, and a transporting bar 20 for transporting a package, from which automatic taking-out of contents is performed, on the fixed guide 10.

Figure 8:
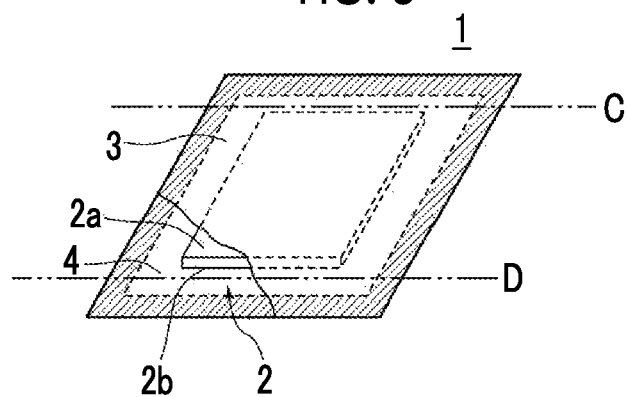
FIG. 8 is a partially broken perspective view illustrating a package as a target to be handled by the device of FIG. 1.

A package to be handled by the present device is illustrated in FIG. 8 as an example. That is, the package 1 is one of so-called strip packages (SP), and is formed by contents 2 being disposed between two packaging sheet materials 3 and 4 and the packaging sheet materials 3 and 4 being joined to each other around the contents 2. In addition, the portion in which the joining is performed is shaded in FIG. 8. The contents 2 is, for example, a cartridge to be used for biochemical analysis, and is obtained by a predetermined reagent being carried in a carrier made of synthetic resins and formed in the shape of a substantially thin rectangular parallelepiped. The packaging sheet materials 3 and 4 are, for example, laminate films formed by superposing aluminum foil sheets, thermoplastic high polymer films, or the like, and joining between these materials is performed by heat welding. The contents 2 (hereinafter referred to as a cartridge 2) is disposed between the packaging sheet materials 3 and 4 in a state where a flat upper surface 2*a* and a flat lower surface 2*b* respectively face the packaging sheet materials 3 and 4.

The fixed guide 10 has a bottom plate 11, and side plates 12 that respectively rise from left and right end portions of the bottom plate 11. The side plates 12 are formed in the state of extending in the direction of an arrow X in the drawing. The X direction is a horizontal direction, and the package 1 is transported in this direction (from a −X direction to a +X direction). That is, a −X side is an upstream side in a transporting direction, and a +X side is a downstream side in the transporting direction. Here, a vertical direction is defined as a Z direction, and a horizontal direction orthogonal to the Z direction and the X direction is defined as a Y direction. In addition, the X direction and the Y direction may be not a strictly horizontal direction but may be a substantially horizontal direction. Additionally, the Z direction may be not a strictly vertical direction but may be a substantially vertical direction.

The bottom plate 11 has a central portion in a width direction (Y direction) formed with a cutout 11*a* that extends in the X direction, and is divided into left and right portions. Moreover, two slits 11*b* and 11*c* that extend in the Y direction are formed at the positions of the bottom plate 11 near a downstream end of the package 1 in the transporting direction. The slits 11*b* and 11*c* are provided for allowing cutting blades to be described below to advance thereinto so as not to interfere with the bottom plate 11, and are formed at a predetermined distance from each other in the X direction.

The two side plates 12 are formed in a state where inner surfaces thereof face each other, and the distance between the inner surfaces thereof is set to be slightly greater than the left-right outer size (an outer size in a direction orthogonal to the transporting direction and in a left-right direction in FIG. 8) of the package 1. Thus, when the package 1 is transported, the positions thereof in the left-right direction (Y direction) are defined by the two side plates 12.

Additionally, the portion of the bottom plate 11 that is present between the slits 11b and 11c is formed with sheet material suction holes 11d that are open to an upper surface of the bottom plate. In the present example, two sheet material suction holes 11d are respectively provided in the bottom plate 11 on the left and right of the cutout 11a, that is, a total of four sheet material suction holes are provided. The sheet material suction holes 11d communicate with an air suction source (not illustrated) including, for example, a vacuum pump or the like via a flexible pipe (not illustrated).

Figure 2:
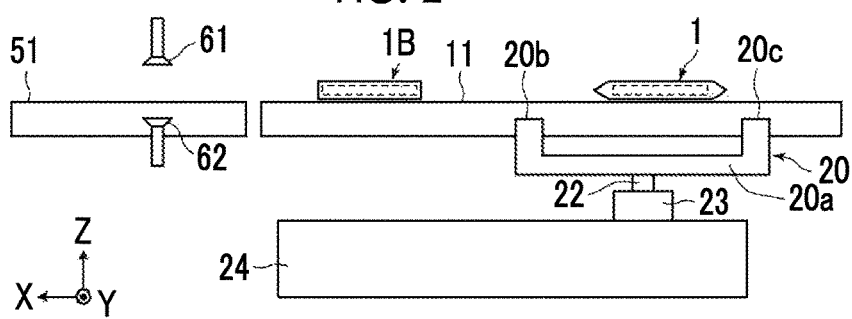
FIG. 2 is a partial side view illustrating a portion of the device of FIG. 1.

Although only a portion of a transporting bar 20 is illustrated in FIG. 1, the side geometry of the overall transporting bar 20 is illustrated in FIG. 2. In addition, FIG. 2 illustrates a state where an X-Z plane including line B-B in FIG. 1 is viewed from a +Y direction to a −Y direction, similar to FIGS. 3 to 5 to be described below. In order to avoid complication of the drawing, the side plates 12 and the like are appropriately omitted and only main components related to the transport of the package 1 are illustrated. As illustrated in this drawing, the transporting bar 20 has a communication portion 20a that extends in the transporting direction, and sending portions 20b and 20c that rise from a front end portion and a rear end portion (that is, an end portion on the downstream side in the transporting direction and an end portion on the upstream side in the transporting direction), respectively, of the communication portion 20a. The transporting bar 20 is made to be movable along the cutout 11a within the cutout 11a formed in the bottom plate 11 of the fixed guide 10.

An upper end of a rod 22 is fixed to the communication portion 20a of the transporting bar 20 from below. The rod 22 is driven by an elevating actuator 23 so as to be extendable and retractable in an up-down direction (vertical direction). The elevating actuator 23 is driven by a transporting actuator 24 so as to be movable in the left-right direction in FIG. 2, that is, in the ±X direction in FIG. 1.

Referring back to FIG. 1, a cutting head elevating robot 31 is arranged on a lateral side of the fixed guide 10. The cutting head elevating robot 31 moves a head connecting portion 32 up and down, and constitutes a cutting unit 30 in conjunction with a cutting head 33 connected to the head connecting portion 32.

Figure 6:
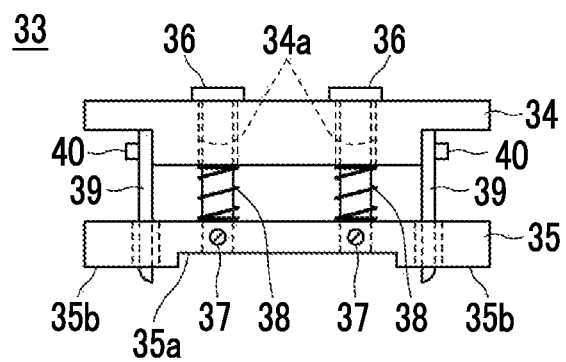
FIG. 6 is a side view illustrating a portion of a cutting unit in the device of FIG. 1.
Figure 7:
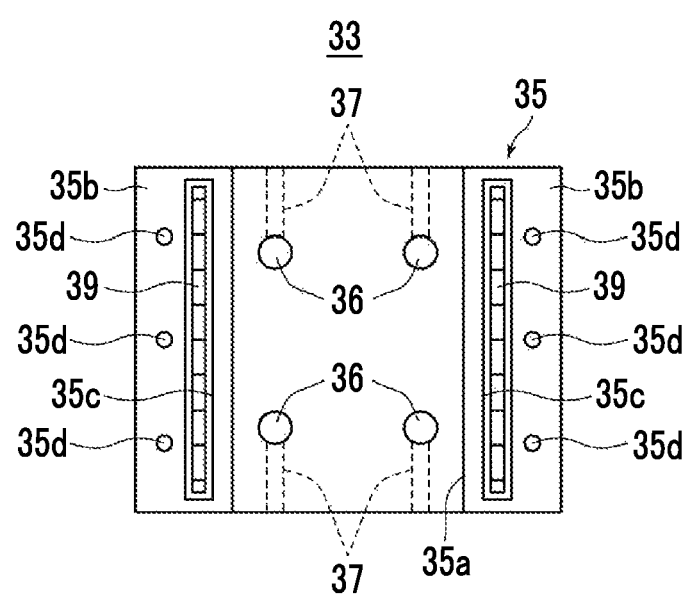
FIG. 7 is a bottom view illustrating a lower surface shape of the cutting unit illustrated in FIG. 7.

FIGS. 6 and 7 are respectively a side view and a bottom view illustrating the cutting head 33 in detail, and the cutting head 33 will be described below with reference to these drawings. The cutting head 33 has a head base 34 that is attached to the head connecting portion 32 and is made movable up and down, and a packaging hold-down 35 that is arranged below the head base 34 at a distance therefrom. The cutting head 33 further has four holding shafts 36 that make the head base 34 hold the packaging hold-down 35, shaft fixing screws 37 that respectively fix lower ends of the holding shafts 36 to the packaging hold-down 35, a total of four coil springs 38 that are respectively wound on the outsides of the holding shafts 36 and are compressively interposed between the packaging hold-down 35 and the head base 34, two cutting blades 39 that are arranged at a distance from each other in the X direction, and cutting blade fixing screws 40 that respectively fix upper portions of the cutting blades 39 to the head base 34.

Although the packaging hold-down 35 is formed in the shape of a substantially quadrangular plate, a concave portion 35a is formed in a lower surface of the packaging hold-down, and hold-down surfaces 35b that protrude slightly downward than the concave portion 35a are formed on the −X side and the +X side with the concave portion 35a therebetween. Additionally, the two cutting blades 39 are arranged at a distance from each other in the X direction in the state of extending in the Y direction, respectively. A lower end surface of each cutting blade 39, that is, a surface illustrated in FIG. 7, is used as a blade surface (cutting unit), and the blade surface is particularly formed in the shape of a saw blade in the present example. The packaging hold-down 35 is formed with two elongated through-holes 35c that are respectively open to the hold-down surfaces 35b, and the two cutting blades 39 are arranged in the state of respectively being inserted into the through-hole 35c. Moreover, three cut piece suction holes 35d are open outside the through-hole 35c in each hold-down surface 35b of the packaging hold-down 35. The cut piece suction holes 35d communicate with an air suction source (not illustrated) including, for example, a vacuum pump or the like via a flexible pipe (not illustrated).

Upper portions of the four holding shafts 36 are respectively inserted through through-holes 34a formed in the head base 34. Although the holding shafts 36 are formed with an external diameter such that a holding shaft becomes substantially close to a through-hole 34a where a bearing is present, the holding shafts are made to be movable in the up-down direction, that is, the Z direction, within the through-holes 34a. An upper end of each holding shaft 36 is formed as a diameter-increased head portion. The packaging hold-down 35 is normally maintained at positions separated to the maximum downward from the head base 34 by the action of the four compressively interposed coil springs 38, that is, at positions (positions illustrated in FIG. 6) where the head portions of the holding shafts 36 come into contact with an upper surface of the head base 34.

Referring back to FIG. 1, an inclined chute 50 is arranged on the +X-direction side of the fixed guide 10. The inclined chute 50 has a bottom plate 51, and side plates 52 that respectively rise from left and right end portions of the bottom plate 51. A cutout 51a that extends in the X direction is formed in alignment with the cutout 11a of the bottom plate 11 at a central portion of the bottom plate 51 in the width direction. The cross-sectional shape of the bottom plate 51 and the two side plates 52 within a plane (within a Y-Z plane) orthogonal to the package transporting direction is made the same as the cross-sectional shape of the bottom plate 11 and the side plates 12 of the fixed guide 10, at an upstream end that faces the fixed guide 10. However, tapered portions in which the distance between the inner surfaces that face each other becomes gradually shorter toward the downstream side of the package transporting direction are formed at halfway points of the two side plates 52, and the distance between the inner surfaces of the two side plates 52 is set to be narrower than the distance therebetween, nearer to a downstream side than the upstream end.

The aforementioned transporting bar 20 is made to be movable along the cutout 51a within the cutout 51a formed within the bottom plate 51 of the inclined chute 50.

Additionally, a plurality of air blowoff ports 51b that stretch in the package transporting direction are formed from the vicinity in which the tapered portion is formed to the downstream end, in each of the portions of an upper surface of the bottom plate 51 near the left and right side plates 52. The air blowoff ports 51*b* communicate with an air discharge source (not illustrated) including, for example, a blower or the like via a flexible pipe (not illustrated).

The inclined chute 50 is fixed onto a rocking block 53 at a position near an upstream end thereof. Additionally, an actuator holding member 54 of which a lower end is fixed to a device body is provided on a lateral side of the inclined chute 50, and a chute inclination actuator 55 is attached to the holding member 54. The chute inclination actuator 55 normally and reversely rotates a driving shaft 55*a* by every predetermined angle, and the rocking block 53 is fixed to the driving shaft 55*a*.

If the chute inclination actuator 55 rotates the driving shaft 55*a* counterclockwise in FIG. 1, the inclined chute 50 connected to the driving shaft 55*a* via the rocking block 53 rocks in a direction in which the downstream end moves down, that is, in a direction of arrow A in FIG. 1, and shifts from a horizontal state to an inclined state. The inclined chute 50 constitutes an inclining unit in the invention in conjunction with the chute inclination actuator 55 and the rocking block 53.

The rocking block 53 has a lower portion extending in the −Y direction and has a vertical wall portion 53*a* that rises from the tip thereof. A suction cup opening/closing actuator 56 is attached to the vertical wall portion 53*a*. The suction cup opening/closing actuator 56 moves two movable blocks 57 and 58, which are arranged at a distance from each other in the up-down direction (vertical direction), so as to be brought close to or separated from each other. Suction cup holding members 59 and 60 that extend in the +Y direction are respectively fixed to the movable blocks 57 and 58. The suction cup holding members 59 and 60 are disposed so that front end portion thereof are respectively located above and below the inclined chute 50. Suction cups 61 and 62 are respectively held by the front end portions of the suction cup holding members 59 and 60.

The suction cups 61 and 62 are formed in the shape of a funnel, for example, using rubber or the like, and are arranged at a distance from each other in the up-down direction in a state where inner surfaces thereof face each other. In addition, a lower suction cup 62 is arranged within the cutout 51*a* formed within the bottom plate 51 of the inclined chute 50. Air pipes 63 and 64 are respectively connected to the suction cups 61 and 62, and the air pipes 63 and 64 are respectively held by at the suction cup holding members 59 and 60. The air pipes 63 and 64 communicate with an air suction source (not illustrated) including, for example, a vacuum pump or the like via a flexible pipe (not illustrated). The suction cups 61 and 62 constitute a suction unit in the invention in conjunction with the air pipes 63 and 64, the flexible pipe, and the air suction source.

If the suction cup opening/closing actuator 56 moves the two movable blocks 57 and 58 as described above, the suction cups 61 and 62, which are respectively held by the suction cup holding members 59 and 60 via the air pipes 63 and 64, move so as to be brought close to or separated from each other. The suction cup opening/closing actuator 56 constitute a driving unit that moves the suction cups 61 and 62, in conjunction with the suction cup holding members 59 and 60.

Hereinafter, the operation of the device of the present embodiment having the above configuration will be described. First, the package 1 as illustrated in FIG. 8 is supplied to and placed on the bottom plate 11 of the fixed guide 10 at the position illustrated in FIG. 2. More specifically, the package 1 is placed in the state of being laid over the bottom plate 11 that is present on both the left and right sides with the cutout 11*a* therebetween. The supply of the package 1 is performed, for example, using a chute (not illustrated) or the like. Additionally, the positions of the package 1 in the left-right direction (Y direction) on the bottom plate 11 are defined by the two side plates 12 as described above.

In addition, a state where one opened (cut) package 1B (to be described below) from which ends of the packaging sheet materials 3 and 4 are cut when the supply of the package 1 is performed is already present on the bottom plate 11 is illustrated in FIG. 2. The fact that the opened package 1B is formed will be described below in detail.

Figure 3:
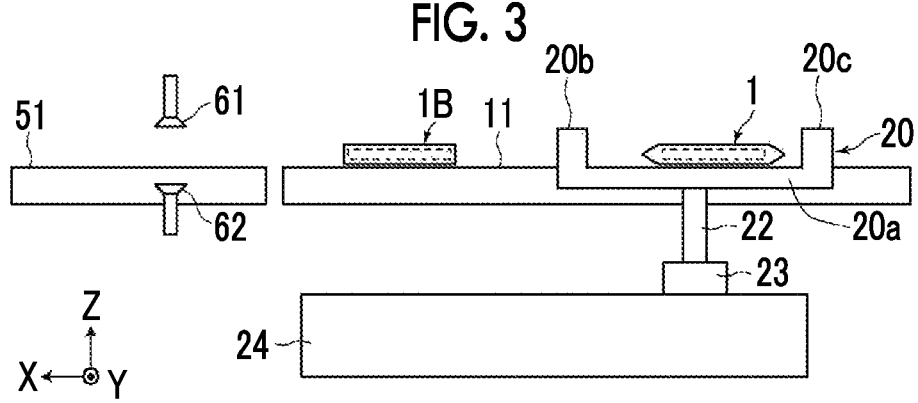
FIG. 3 is a partial side view illustrating that the portion illustrated in FIG. 2 is in another state.

If one package 1 is supplied as described above, the rod 22 is extended by the elevating actuator 23, and the transporting bar 20 that is present at a standby position (position illustrated in FIG. 2) until then moves up to a position illustrated in FIG. 3. In addition, the standby position of the transporting bar 20 is a position in a case where the respective upper surfaces of the sending portions 20*b* and 20*c* of the transporting bar 20 are located below the upper surface of the bottom plate 11, and the elevating actuator 23, which is driven by the transporting actuator 24 and moves at a predetermined stroke in the left-right direction (±X direction) in FIG. 2, is present nearest to the right side in FIG. 2, that is, nearest to the upstream side in the package transporting direction.

Next, the transporting actuator 24 is driven, and the elevating actuator 23 moves to the left in FIG. 3. Then, the sending portion 20*c* of the transporting bar 20 pushes the package 1 and transports the package 1 to the left. Additionally, the opened package 1B, which is already present on the bottom plate 11, is also pushed by the sending portion 20*b* of the transporting bar 20, and is similarly transported to the left.

Figure 4:
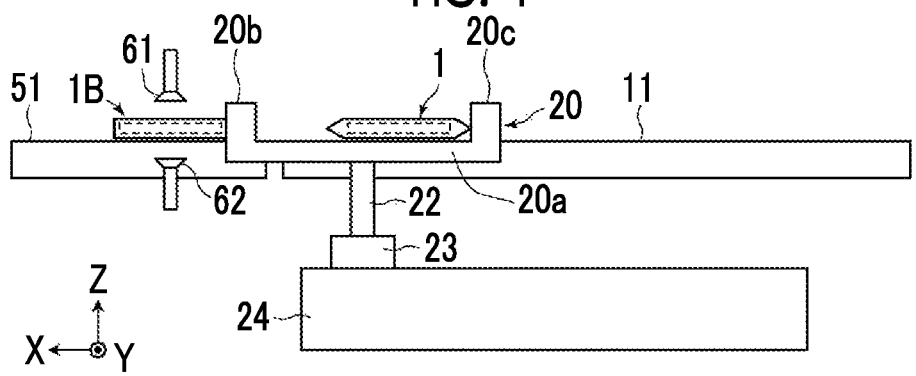
FIG. 4 is a partial side view illustrating that the portion illustrated in FIG. 2 is in still another state.

If the elevating actuator 23 comes to a position illustrated in FIG. 4, the driving of the transporting actuator 24 is stopped. In this case, the package 1 is disposed at a position (cutting processing position) where two end portions of the packaging sheet materials 3 and 4 can be cut by the cutting head 33 of FIG. 1. Additionally, the opened package 1B pushed by the sending portion 20*b* is separated from on the bottom plate 11, and is sent onto the bottom plate 51 of the inclined chute 50. The opened package 1B transported in this way is finally disposed at a position (sheet material expansion position) where the suction cups 61 and 62 are respectively present above and below the opened package and the two packaging sheet materials 3 and 4 can be opened up and down. In addition, the opened package 1B is disposed in the inclined chute 50 in a state where the opened package is laid over the portions of the bottom plate 51 that are present on both sides of the cutout 51*a*.

If the above state is brought about, the elevating actuator 23 is driven and the rod 22 is retracted, and the transporting actuator 24 is driven so as to move the elevating actuator 23 to the right in FIG. 4 contrary to the above. Accordingly, the transporting bar 20 is returned to a position illustrated in FIG. 5, that is, the aforementioned standby position. The transporting bar 20 that is returned to the standby position in this way, stands by the following package 1 being supplied to and placed on the bottom plate 11.

Next, with reference to FIGS. 1, 6, and 7, a cutting process for the package 1 disposed at the cutting processing positions will be described. The packaging sheet materials 3 and 4 of the package 1 illustrated in FIG. 8 are cut at two cutting spots C and D illustrated in this drawing. The cutting spots C and D are linear spots as an example, and more specifically, are spots that are respectively present between a sheet material joining portion (shadowed area in this drawing) and the cartridge 2 and face each other with the cartridge 2 therebetween.

The cutting processing positions of the package 1 illustrated in FIG. 4 are positions where the cutting spots C and D are disposed on the slits 11c and 11b of the bottom plate 11 respectively illustrated in FIG. 1. If the package 1 is disposed at the cutting processing positions, the cutting head elevating robot 31 illustrated in FIG. 1 is driven, and the head connecting portion 32 moves down. Then, the cutting head 33 connected to the head connecting portion 32 moves down, and the two end portions of the packaging sheet materials 3 and 4 are cut by the cutting head 33. Hereinafter, this cutting will be described in detail.

If the cutting head 33 moves down, first, the packaging hold-down 35 is brought into pressure contact with the package 1 from above. Accordingly, the package 1 is held down from above and below by the packaging hold-down 35 and the bottom plate 11 of the fixed guide 10, and is maintained in a state where the package does not move. In this case, the cartridge 2 in the package 1 enters the concave portion 35a of the packaging hold-down 35, and is held down from above and below by the concave portion 35a and the bottom plate 11. That is, the packaging hold-down 35 functions as a package fixing unit. The packaging sheet materials 3 and 4 that are present outside the cartridge 2, that is, on the cutting spots C and D side, are held down from above and below by the hold-down surface 35b of the packaging hold-down 35 and the bottom plate 11.

Additionally, after the packaging hold-down 35 is brought into pressure contact with the package 1, air suction is performed from the four sheet material suction holes 11d of the bottom plate 11 and the six cut piece suction holes 35d of the packaging hold-down 35. This air suction is performed by the aforementioned air suction source that respectively communicates with the sheet material suction holes 11d and the cut piece suction holes 35d. Accordingly, the substantially central portion of the packaging sheet material 4 of the package 1 is suctioned by and fixed to the four sheet material suction holes 11d. Additionally, both ends (portions respectively outside the cutting spots C and D) of the packaging sheet material 3 of the package 1 are respectively suctioned by and fixed to the three cut piece suction holes 35d. The cut piece suction holes 35d function as a packaging sheet material fixing unit.

After the package 1 is held down between the packaging hold-down 35 and the bottom plate 11 as above, the cutting head 33 further moves down. Then, the head base 34 moves downward relative to the holding shafts 36 and the packaging hold-down 35, while compressing the four coil springs 38. If the head base 34 moves down in this way, the two cutting blades 39 fixed to the head base move down, and move within the through-holes 35c that are open to the hold-down surface 35b of the packaging hold-down 35, and protrudes further downward from the hold-down surface 35b. As the two cutting blades 39 move down in this way, the packaging sheet materials 3 and 4 of the package 1 held down in a state where the packaging sheet materials do not move are cut in the two cutting spots C and D by the cutting blades 39.

Figure 9:
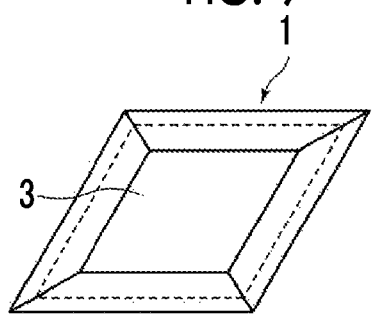
FIG. 9 is a view schematically illustrating cutting processing of a packaging sheet material.
Figure 10:
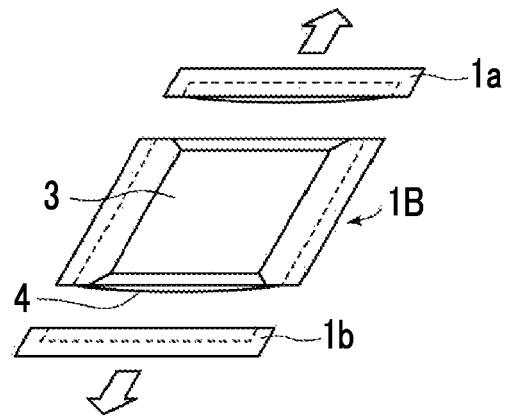
FIG. 10 is a view schematically illustrating the cutting processing of the packaging sheet material.

FIGS. 9 and 10 schematically illustrate the cutting of the packaging sheet materials 3 and 4 described above. That is, the package 1 before cutting is brought into the state as illustrated in FIG. 9, and if cutting is performed, as illustrated in FIG. 10, the two end portions of the packaging sheet materials 3 and 4 are cut, and the package 1 becomes the opened package 1B. Then, the two cut end portions of the packaging sheet materials 3 and 4 become the cut pieces 1a and 1b.

If the packaging sheet materials 3 and 4 are cut in the spots as described above, the cutting head elevating robot 31 of FIG. 1 is driven in a direction opposite to the above-described case, and the head connecting portion 32 moves up. Then, the cutting head 33 connected to the head connecting portion 32 moves up, the two cutting blades 39 are first separated upward from the opened package 1B, and the packaging hold-down 35 is then separated upward from the opened package 1B.

In addition, if the packaging hold-down 35 is separated upward from the opened package 1B, the air suction from the four sheet material suction holes 11d is stopped. Then, the opened package 1B, as illustrated in FIG. 4, is brought into a state where the opened package can be pushed and transported by the sending portion 20b of the transporting bar 20.

Meanwhile, the air suction from the cut piece suction holes 35d of the packaging hold-down 35 is maintained even if the packaging hold-down 35 is separated upward from the opened package 1B. Thus, the two cut end portions of the packaging sheet materials 3 and 4, that is, the cut pieces 1a and 1b illustrated in FIG. 10, are respectively suctioned and held by the three cut piece suction holes 35d, and are carried to positions separated upward from the fixed guide 10.

The cutting head 33 equipped with the packaging hold-downs 35 as described above can also be configured as a sheet material end portion disposal unit that sends the cut pieces 1a and 1b to a disposal position and disposes of the cut pieces. That is, for example, a configuration is considered in which an inclined chute plate that enters under the cut pieces 1a and 1b from a lateral side is provided in a place where the cutting head 33 has moves up to the highest position in a state where the cut pieces 1a and 1b are suctioned and held by the cut piece suction holes 35d of the packaging hold-down 35. According to such a configuration, the cut pieces 1a and 1b can be disposed of at the disposal position on the inclined chute plate by stopping the air suction from the cut piece suction holes 35d in the place where the inclined chute plate has entered under the cut pieces 1a and 1b.

In such a case, it is also possible to make the cut pieces 1a and 1b slide on the inclined chute to send the cut pieces to a disposal position in a more distant place. Moreover, it is also possible to send and collect the cut pieces 1a and 1b, which have slid down on the inclined chute plate, to and in a container for collection or the like.

Figure 5:
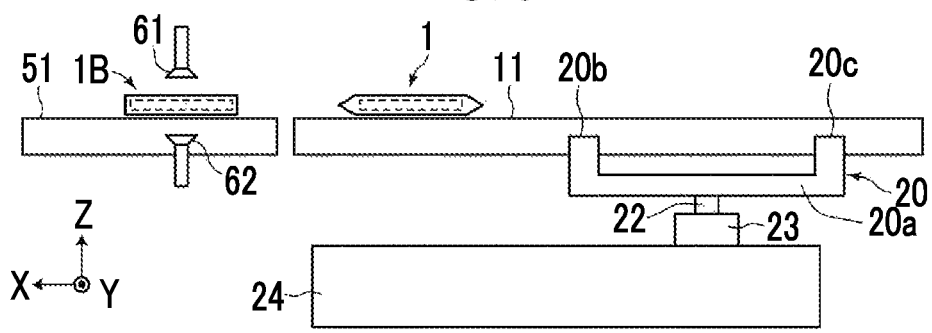
FIG. 5 is a partial side view illustrating that the portion illustrated in FIG. 2 is in still another state.

Next, a sheet material expansion process performed at a position after the opened package 1B is transported to the position (sheet material expansion position) illustrated in FIG. 4 or FIG. 5 will be described. The sheet material expansion process is a process of moving the two packaging sheet materials 3 and 4 of the opened package 1B in a direction separated from the cartridge 2, and increasing the distance between the two packaging sheet materials 3 and 4.

If the opened package 1B is disposed at the sheet material expansion position on the bottom plate 51 of the inclined chute 50, the suction cup opening/closing actuator 56 illustrated in FIG. 1 is driven, and the suction cup holding members 59 and 60 are moved so as to be brought close to each other. Thus, the suction cups 61 and 62, which are respectively attached to the suction cup holding members 59 and 60 via the air pipes 63 and 64, are moved so as to be brought close to each other, the suction cup 61 comes into contact with the packaging sheet material 3 of the opened package 1B from above, and the suction cup 62 comes into contact with the packaging sheet material 4 of the opened package 1B from below.

Figure 11:
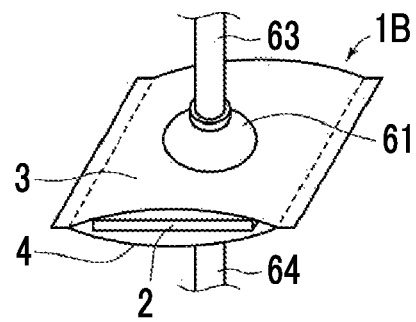
FIG. 11 is a view schematically illustrating the processing of increasing the distance between packaging sheet materials.

If this state is brought about, the aforementioned air suction source that communicates with the suction cups 61 and 62 via the air pipe 63 and 64 or the flexible pipe (not illustrated) is driven, and air suction is respectively performed from the suction cups 61 and 62. Accordingly, the packaging sheet materials 3 and 4 of the opened package 1B are respectively suctioned and held by the suction cups 61 and 62. Next, the suction cup opening/closing actuator 56 is driven in the direction opposite to the above case, and the suction cup holding members 59 and 60 are moved so as to be separated from each other. Thus, the suction cups 61 and 62 that are respectively attached to the suction cup holding members 59 and 60 via the air pipes 63 and 64 are moved so as to be separated from each other. Accordingly, the packaging sheet material 3 of the opened package 1B is pulled upward by the suction cup 61, the packaging sheet material 4 of the opened package 1B is pulled downward by the suction cup 62, and the distance between the packaging sheet materials 3 and 4 is increased. FIG. 11 schematically illustrates the opened package 1B in which the packaging sheet materials 3 and 4 are formed into a tubular shape in this way.

Figure 12:
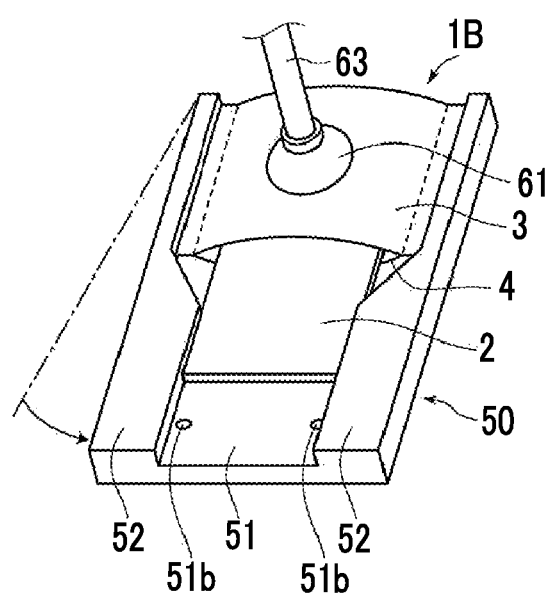
FIG. 12 is a view schematically illustrating the processing of inclining the packaging sheet material and contents from a horizontal state.

If the above state is brought about, next, the chute inclination actuator 55 illustrated in FIG. 1 is driven so as to rotate the driving shaft 55a counterclockwise in FIG. 1. Then, the inclined chute 50 rocks in the direction of arrow A in FIG. 1, and shifts from the horizontal state to the inclined state as previously described. FIG. 12 schematically illustrates that the inclined chute 50 shifts from the horizontal state to the inclined state. In addition, in this case, the suction cups 61 and 62 also move integrally with the inclined chute 50.

If the inclined chute 50 is brought into the inclined state in this way, the opened package 1B held by the suction cups 61 and 62 is also brought into the inclined state (that is, state where one cutting spot C is at a position higher than the other cutting spot D), and the cartridge 2 slips and falls out of the cutting spot D of the packaging sheet materials 3 and 4. In this case, since the distance between the two packaging sheet materials 3 and 4 is increased as described above, the cartridge 2 reliably slips and falls out from between the packaging sheet materials 3 and 4 without being caught in the packaging sheet materials 3 and 4.

As illustrated in FIG. 12, the cartridge 2 that has slipped out from between the packaging sheet materials 3 and 4 are positioned from left and right by one pair of side plates 52 of the inclined chute 50, and the cartridge is transferred in a predetermined posture on the inclined chute 50. This transfer is performed as the cartridge 2 slides down on the inclined chute 50 in the inclined state. In this case, a proper amount of air is blown off from the plurality of air blowoff ports 51b that are open to the upper surface of the bottom plate 51 of the inclined chute 50. Thus, since a thin layer of this blown-off air is brought into the state of being interposing between the bottom plate 51 and the cartridge 2, the transfer of the cartridge 2 is smoothly performed.

In addition, the cartridge 2 transferred on the inclined chute 50 in a predetermined posture as described above, is sent to, for example, a use position in a biochemical analysis device directly from the inclined chute 50 or via other transfer units, and is provided for biochemical analysis there.

In addition, the distance between one pair of side plates 52 is made wider in order to store the opened package 1B, nearer to an upstream side in a cartridge transfer direction than the portions of the cartridge 2 that are positioned from left and right by one pair of side plates 52. Thus, the cartridge 2 immediately after slipping out of the opened package 1B cannot be positioned. However, since the tapered portion as described above is formed at one pair of side plates 52, the cartridge 2 is smoothly guided to a positioning portion (a portion in which the distance between one pair of side plates 52 becomes narrow), by the action of the tapered portion. That is, this entire portion functions as a contents transfer unit that transfers contents in a predetermined posture.

Figure 13:
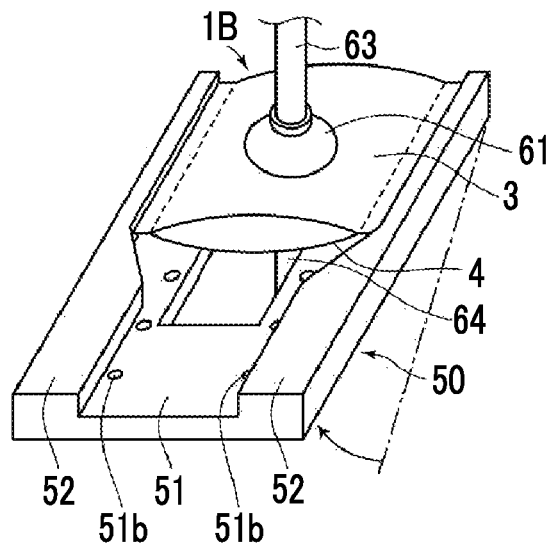
FIG. 13 is a view schematically illustrating the processing of returning the packaging sheet material to the horizontal state.

If the cartridge 2 is discharged from the inclined chute 50 in a state where the cartridge is positioned, the chute inclination actuator 55 is driven so as to rotate the driving shaft 55a clockwise in FIG. 1. Accordingly, the inclined chute 50 is returned from the inclined state to the horizontal state, and stands by the following opened package 1B being transported. The inclined chute 50 in this state is schematically illustrated in FIG. 13.

Figure 14:
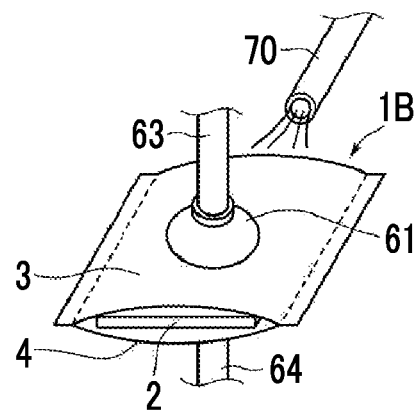
FIG. 14 is a perspective view illustrating an example of a drop assisting unit.
Figure 15:
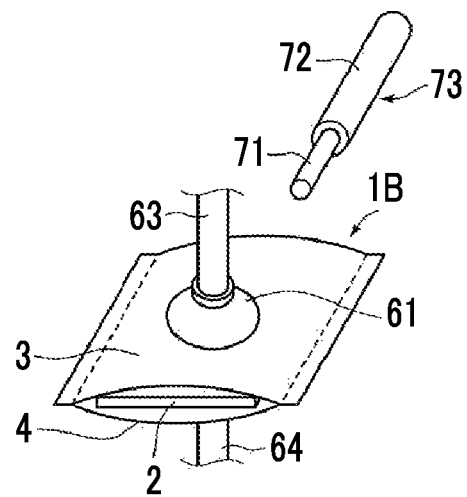
FIG. 15 is a perspective view illustrating another example of the drop assisting unit.

In addition, in the present device, when the opened package 1B is brought into the inclined state, it is desirable to further provide a unit that pushes the cartridge 2 in a direction toward the lower cutting spot D, and assists dropping of the cartridge 2 from the higher cutting spot C. As such a drop assisting unit, for example, as illustrated in FIG. 14, an air jetting pipe 70 that generates an air jet stream and pushes the cartridge 2 with the jet stream can be applied. Moreover, as illustrated in FIG. 15, a drop assisting unit 73 equipped with a rod-shaped pusher 71 and an actuator 72 that reciprocates the pusher 71 and adapted to push the cartridge 2 with the pusher 71 can also be applied. As the actuator 72, well-known actuators, such as an actuator that operates mechanically, an actuator that operates electromagnetically, and an actuator that operates with compressed air, are appropriately available.

The above-described suction cup holding members 59 and 60 and suction cups 61 and 62 can also be constituted as a sheet material central portion disposal unit that sends the packaging sheet materials 3 and 4 of the opened package 1B to the disposal position, and disposes of the packaging sheet material. That is, for example, a configuration in which the suction cup holding member 59 is made reciprocable within the horizontal plane is considered. According to such a configuration, with the packaging sheet material 3 being suctioned and held by the upper suction cup 61, the air suction from the lower suction cup 62 is stopped to release the packaging sheet material 4. In that state, as the air suction from the suction cup 61 is stopped in a place where the suction cup holding member 59 is rotated by, for example, about 90 degrees from the position illustrated in FIG. 1, the packaging sheet materials 3 and 4 (only central portions after cutting) held by the suction cup 61 can be dropped to the disposal position and can be disposed of.

In addition, in the embodiment described above, the cutting blades 39 of which the blade surfaces are formed in the shape of a saw blade are used. However, the invention is not limited to this, and cutting blades of which cutting surfaces are formed in the shape of a straight blade can also be applied. Additionally, the cutting blades 39 are configured so as to cut the packaging sheet materials 3 and 4 in the cutting spots C and D having one linear shape. However, the shape of the cutting spots are not limited to this, and can be variously set according to the shape of a joining portion between the packaging sheet materials 3 and 4.

Figure 16:
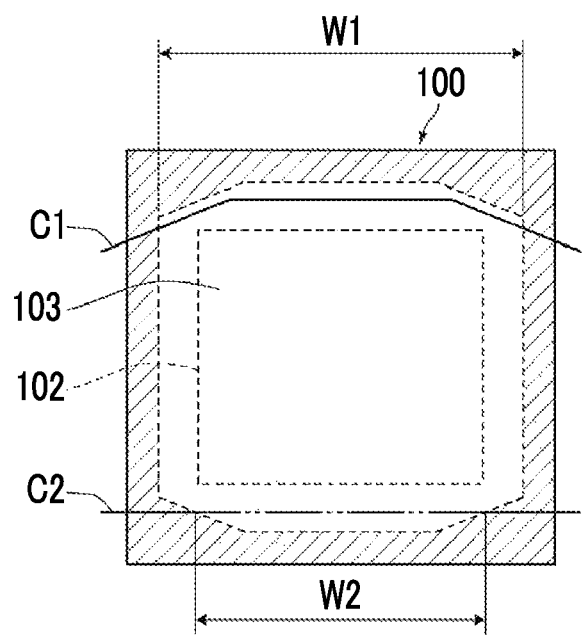
FIG. 16 is a schematic view illustrating cutting spots of the packaging sheet material to be set in the method of the invention.

For example, a package 100 illustrated in FIG. 16 is obtained by packaging substantially thin rectangular parallelepiped-shaped contents 102, using a packaging sheet material 103 and another packaging sheet material (not illustrated) that faces the packaging sheet material 103. However, a joining portion between these packaging sheet materials (hereinafter referred to as the packaging sheet material 103 and the like) is formed in a shaded shape in this drawing. When such packaging sheet material 103 and the like of the package 1 are cut in a linear cutting spot C2 illustrated in this drawing, the opening width of the packaging sheet material 103 and the like becomes a width represented by W2 in this drawing. In this degree of opening width W2, left and right end portions of the contents 102 may be caught in the packaging sheet material joining portion at an opening end when the contents is taken out, and the taking-out of the contents may become impossible.

In contrast, it is also considered that a cutting blade is formed in a bent shape in two spots, and performs cutting in a cutting spot C1 having a shape resembling the shape of the joining portion between the packaging sheet material 103 and the like, that is, a shape along an inner end edge (an end edge where the contents 102 is present) of the joining portion. In such a case, the opening width of the packaging sheet material 103 and the like becomes a width represented by W1 in this drawing, and becomes wider than the opening width W2. In this way, in order to make the opening width wider, it is possible to perform cutting in a shape resembling the shape of the joining portion, thereby preventing the left and right end portions of the contents 102 from being caught in the packaging sheet material joining portion of the opening end and more reliably performing taking-out.

Additionally, when contents to be packaged is, for example, thin columnar contents, the shape of the inner end edge of the joining portion between the packaging sheet materials may be a shape that forms a portion of a circular arc. Even in such a case, by adopting the shape of the cutting spots as a shape along the circular arc, it is possible to make the opening width of the packaging sheet materials wider compared to a case where the shape of the cutting spots is a linear shape.

Additionally, in the embodiment described above, one suction cup 61 is disposed for one packaging sheet material 3 and another suction cup 62 is disposed for another packaging sheet material 4. However, a plurality of suction cups may be provided for one packaging sheet material depending on the size or the like of the packaging sheet material so as to more reliably suction and hold the packaging sheet material.

In such a case, it is preferable to arrange the plurality of suction cups in a direction orthogonal to a direction where a cutting spot of the packaging sheet material extends, that is, side by side in the X direction in the configuration of FIG. 1. Moreover, for example, when a packaging sheet material is particularly large, a plurality of suction cups (for example, two×two) may be arranged side by side in the X direction and the Y direction, respectively.

Moreover, the invention is not limited to the suction cups 61 and 62 having the circular suction surfaces described above. For example, a suction unit having elongated oblong suction surfaces can also be applied. When this type of suction unit is applied, it is preferable to arrange the major axes of the elongated suction surfaces along the cutting direction of the cutting spots of the packaging sheet materials. If such arrangement is adopted, the processing of increasing the distance between the two packaging sheet materials near the cutting spots is more reliably performed.

Additionally, in the method and device of the invention, it is possible to handle packages in which the two packaging sheet materials are formed, for example, in a circular shape or a polygonal shape other than a quadrilateral shape, or packages in which contents is formed, for example, in a thin columnar shape, a polyhedron shape, and an irregular shape other than the substantially thin rectangular parallelepiped shape.

Additionally, in the embodiment described above, the package in which the two packaging sheet materials are joined together by, for example, heat welding or the like in four sides around the packaging sheet materials 3 and 4 or the packaging sheet material 103 and the like is used as a target to be handled. However, the method and the device of the invention can also handle packages having sheet material joining structures other than such a package.

Figure 17:
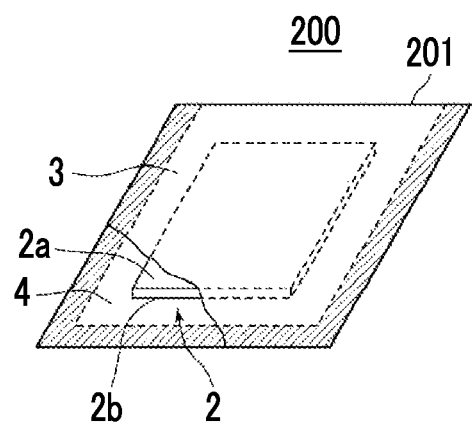
FIG. 17 is a partially broken perspective view illustrating another example of the package.

For example, a package 200 illustrated in FIG. 17 is obtained by one sheet material being used as the upper and lower packaging sheet materials 3 and 4, the sheet material is bent at one side 201, and the packaging sheet materials 3 and 4 being joined together by heat welding or the like at the other three sides. In addition, in FIG. 17, the elements illustrated in FIG. 1 and the like as previously above are designated by the same numerals, and the duplicate description thereof are omitted. The package 200 having such a structure is also included in the "package in which the contents to be packaged is disposed between the two packaging sheet materials and the two packaging sheet materials are joined to each other around the contents" as a target to be handled by the method and the device of the invention.

Additionally, the embodiment described above relates to the device and the method that automatically takes out packaged contents. Although an embodiment in which the processes described above are altogether automatically performed is preferable, an embodiment in which a person determines the start of the respective processes is also included in the invention.

What is claimed is:

1. An automatic taking-out device for packaged contents that automatically takes out the contents from a package formed by the contents to be packaged being disposed between two packaging sheet materials and the two packaging sheet materials being joined to each other around the contents, the automatic taking-out device comprising:
   a package holder that holds the package in a state where the two packaging sheet materials are located up and down with respect to each other;
   a cutter that cuts the two packaging sheet materials of the package in a held state in two cutting spots that are respectively present between the joining portions and the contents and that face each other with the contents therebetween;
   a pair of suction holders that respectively suction and hold the two packaging sheet materials in between the two cutting spots;
   a driver that moves at least one of the pair of suction holders in a direction separated from the contents; and
   an incliner that inclines the two packaging sheet materials in between the two cutting spots and the contents in a state where a positional deviation in an up-down direction occurs with respect to the two cutting spots, and drops the contents out of the two packaging sheet materials.

2. The automatic taking-out device for packaged contents according to claim 1, further comprising:
   a package fixer that presses the two packaging sheet materials from above and below to fix the two packaging sheet materials and the contents between the two packaging sheet materials when the cutting using the cutter is performed.

3. The automatic taking-out device for packaged contents according to claim 1, further comprising:
a sheet material central portion disposer that sends the portions of the two packaging sheet materials in between the two cutting spots to a disposal position, and disposes of the portions after the contents fall out of the two packaging sheet materials.

4. The automatic taking-out device for packaged contents according to claim 1, further comprising:
a contents transfer unit that transfers the contents taken out of the two packaging sheet materials in a predetermined posture.

5. The automatic taking-out device for packaged contents according to claim 1,
wherein the cutter performs the cutting in cutting spots having a shape resembling the shape of the joining portions of the packaging sheet materials.

6. The automatic taking-out device for packaged contents according to claim 1,
wherein the cutter is a cutter having a saw blade shape.

7. The automatic taking-out device for packaged contents according to claim 1,
wherein a plurality of the suction holders are provided for one packaging sheet material.

8. The automatic taking-out device for packaged contents according to claim 7,
wherein the plurality of suction holders are arranged side by side in a direction orthogonal to a cutting direction of the cutting spots.

9. The automatic taking-out device for packaged contents according to claim 1,
wherein the suction holder is a suction holder in which a major axis of a suction surface extends along a cutting direction of the cutting spots.

10. An automatic taking-out device for packaged contents that automatically takes out the contents from a package formed by the contents to be packaged being disposed between two packaging sheet materials and the two packaging sheet materials being joined to each other around the contents, the automatic taking-out device comprising:
a package holder that holds the package in a state where the two packaging sheet materials are located up and down with respect to each other;
a cutter that cuts the two packaging sheet materials of the package in a held state in two cutting spots that are respectively present between the joining portions and the contents and that face each other with the contents therebetween;
a pair of suction holders that respectively suction and hold the two packaging sheet materials in between the two cutting spots;
a driver that moves at least one of the pair of suction holders in a direction separated from the contents;
an incliner that inclines the two packaging sheet materials in between the two cutting spots and the contents in a state where a positional deviation in an up-down direction occurs with respect to the two cutting spots, and drops the contents out of the two packaging sheet materials; and
a drop assisting unit that pushes the contents in a direction toward a lower cutting spot of the two cutting spots from an upper cutting spot of the two cutting spots when the two packaging sheet materials and the contents is inclined by the incliner.

11. The automatic taking-out device for packaged contents according to claim 10,
wherein the drop assisting unit pushes the contents with an air jet stream.

12. The automatic taking-out device for packaged contents according to claim 10,
wherein the drop assisting unit pushes the contents using a pusher that reciprocates.

13. An automatic taking-out device for packaged contents that automatically takes out the contents from a package formed by the contents to be packaged being disposed between two packaging sheet materials and the two packaging sheet materials being joined to each other around the contents, the automatic taking-out device comprising:
a package holder that holds the package in a state where the two packaging sheet materials are located up and down with respect to each other;
a cutter that cuts the two packaging sheet materials of the package in a held state in two cutting spots that are respectively present between the joining portions and the contents and that face each other with the contents therebetween;
a pair of suction holders that respectively suction and hold the two packaging sheet materials in between the two cutting spots;
a driver that moves at least one of the pair of suction holders in a direction separated from the contents;
an incliner that inclines the two packaging sheet materials in between the two cutting spots and the contents in a state where a positional deviation in an up-down direction occurs with respect to the two cutting spots, and drops the contents out of the two packaging sheet materials; and
a package fixer that presses the two packaging sheet materials from above and below to fix the two packaging sheet materials and the contents between the two packaging sheet materials when the cutting using the cutter is performed.

14. An automatic taking-out device for packaged contents that automatically takes out the contents from a package formed by the contents to be packaged being disposed between two packaging sheet materials and the two packaging sheet materials being joined to each other around the contents, the automatic taking-out device comprising:
a package holder that holds the package in a state where the two packaging sheet materials are located up and down with respect to each other;
a cutter that cuts the two packaging sheet materials of the package in a held state in two cutting spots that are respectively present between the joining portions and the contents and that face each other with the contents therebetween;
a pair of suction holders that respectively suction and hold the two packaging sheet materials in between the two cutting spots;
a driver that moves at least one of the pair of suction holders in a direction separated from the contents;
an incliner that inclines the two packaging sheet materials in between the two cutting spots and the contents in a state where a positional deviation in an up-down direction occurs with respect to the two cutting spots, and drops the contents out of the two packaging sheet materials; and
a sheet material end portion disposal unit that sends the portions of the two packaging sheet materials outside the two cutting spots to a disposal position and disposes of the portions after the cutting is performed.

* * * * *